United States Patent
Hooli et al.

(10) Patent No.: US 9,295,040 B2
(45) Date of Patent: Mar. 22, 2016

(54) PACKET SCHEDULING IN COMMUNICATIONS

(75) Inventors: Kari Juhani Hooli, Oulu (FI); Esa Tapani Tiirola, Kempele (FI); Kari Pekka Pajukoski, Oulu (FI); Timo Erkki Lunttila, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 57 days.

(21) Appl. No.: 14/348,756

(22) PCT Filed: Sep. 30, 2011

(86) PCT No.: PCT/EP2011/067152
§ 371 (c)(1),
(2), (4) Date: Mar. 31, 2014

(87) PCT Pub. No.: WO2013/044985
PCT Pub. Date: Apr. 4, 2013

(65) Prior Publication Data
US 2015/0257144 A1    Sep. 10, 2015

(51) Int. Cl.
*H04W 4/00*    (2009.01)
*H04W 72/04*   (2009.01)
*H04W 72/12*   (2009.01)

(52) U.S. Cl.
CPC ...... *H04W 72/0413* (2013.01); *H04W 72/0406* (2013.01); *H04W 72/042* (2013.01); *H04W 72/0446* (2013.01); *H04W 72/1252* (2013.01)

(58) Field of Classification Search
CPC ............... H04W 72/0413; H04W 72/0406; H04W 72/042; H04W 72/0446; H04W 72/1252
See application file for complete search history.

(56) References Cited

U.S. PATENT DOCUMENTS

| | | | |
|---|---|---|---|
| 2011/0239072 A1* | 9/2011 | Cai | 714/748 |
| 2012/0093096 A1* | 4/2012 | Barbieri et al. | 370/329 |
| 2012/0093121 A1* | 4/2012 | Zhang | 370/329 |
| 2012/0147838 A1* | 6/2012 | Qin et al. | 370/329 |
| 2012/0155416 A1* | 6/2012 | Zhang et al. | 370/329 |
| 2013/0021965 A1* | 1/2013 | Chu et al. | 370/328 |

FOREIGN PATENT DOCUMENTS

| | | |
|---|---|---|
| EP | 2 166 810 A2 | 3/2010 |
| WO | WO 2008/153461 A1 | 12/2008 |

* cited by examiner

*Primary Examiner* — Clemence Han
(74) *Attorney, Agent, or Firm* — Harrington & Smith

(57) ABSTRACT

A method is disclosed for scheduling packet data in a communications system. The method includes configuring, in a network apparatus, semi-persistent transmission resources to a user equipment via higher layer signalling, wherein the configuring step includes pre-allocating a data transmission resource and assigning a scheduling request resource to the user equipment. A confirmation message is transmitted to the user equipment from the network apparatus, wherein the confirmation message informs the user equipment that the user equipment is able to start transmitting data on a physical uplink shared channel PUSCH to the network apparatus by using the pre-allocated data transmission resource and a pre-configured transmission format, wherein the pre-allocated data transmission resource is linked to the corresponding confirmation message, the corresponding confirmation message being linked to the corresponding semi-persistently assigned scheduling request resource.

20 Claims, 4 Drawing Sheets

PACKET SCHEDULING IN COMMUNICATIONS

FIELD OF THE INVENTION

The exemplary and non-limiting embodiments of this invention relate generally wireless communications networks, and more particularly to managing packet scheduling.

BACKGROUND ART

The following description of background art may include insights, discoveries, understandings or disclosures, or associations together with dis-closures not known to the relevant art prior to the present invention but provided by the invention. Some such contributions of the invention may be specifically pointed out below, whereas other such contributions of the invention will be apparent from their context.

Scheduling refers to a process of dividing and allocating resources between user terminals that have data to transfer or receive. In LTE, dynamic scheduling (with a minimum time granularity of 1 ms) is applied both to the uplink and downlink. Scheduling should result in a balance between perceived end-user quality and overall system performance.

For services with small payloads and regular packet arrivals, the control signalling required for dynamic scheduling might be disproportionately large relative to the amount of user data transmitted. For this reason, LTE also supports persistent scheduling (in addition to dynamic scheduling). Persistent scheduling implies that radio resources are allocated to a user for a given set of sub-frames.

Thus, user terminals may be scheduled on the LTE air interface by using dynamic scheduling. Scheduling may be fully dynamic. In downlink direction resources may be assigned when data is available. For data to be sent in the uplink, the user terminal dynamically requests transmission opportunities when data arrives in the user terminal's uplink buffer. Scheduling information related to data being sent in downlink direction or uplink transmission resources are carried in a physical downlink control channel (PDCCH) which is available at the beginning of each downlink sub-frame. User terminals may also be scheduled on the LTE air interface by using semi-persistent scheduling (SPS). While dynamic scheduling is suited for bursty, infrequent and bandwidth consuming data transmissions (e.g. web surfing, video streaming, emails) it is less suited for deterministic low data rate applications, such as voice calls. If the data rate of the stream is very low, as is the case for voice calls, the overhead of the scheduling messages is very high as only little data is sent for each scheduling message. The solution for this is semi-persistent scheduling. Instead of scheduling each uplink or downlink transmission separately, a transmission pattern is defined instead of single opportunities. This significantly reduces the scheduling assignment overhead.

During silent periods, the wireless voice codecs may stop transmitting voice data and may only send silence description information with much longer time intervals in between. Only retransmissions and SID frames are scheduled dynamically, i.e. it may be referred to as semi-persistent scheduling.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise a method, apparatuses, a computer program product, and a computer-readable storage medium as defined in the independent claims. Further embodiments of the invention are disclosed in the dependent claims.

An aspect of the invention relates to a method for scheduling aperiodic packet data in a communications system, the method comprising configuring, in a network apparatus, semi-persistent transmission resources to a user equipment via higher layer signalling, wherein the configuring includes pre-allocating a data transmission resource and assigning a scheduling request resource to the user equipment; and transmitting, from the network apparatus a confirmation message to the user equipment, the confirmation message informing the user equipment that the user equipment is able to start transmitting data on a physical uplink shared channel PUSCH to the network apparatus by using the pre-allocated data transmission resource and a pre-configured transmission format, wherein the pre-allocated data transmission resource is linked to the corresponding confirmation message, the corresponding confirmation message (303) being linked to the corresponding semi-persistently assigned scheduling request resource.

A further aspect of the invention relates to an apparatus comprising a communication control circuitry configured to configure semi-persistent transmission resources to a user equipment via higher layer signalling, wherein the configuring includes pre-allocating a data transmission resource and assigning a scheduling request resource to the user equipment; and transmit a confirmation message to the user equipment, the confirmation message informing the user equipment that the user equipment is able to start transmitting data on a physical uplink shared channel PUSCH to the apparatus by using the pre-allocated data transmission resource and a pre-configured transmission format, wherein the pre-allocated data transmission resource is linked to the corresponding confirmation message, the corresponding confirmation message (303) being linked to the corresponding semi-persistently assigned scheduling request resource.

A still further aspect of the invention relates to an apparatus comprising means for carrying out the method according to an embodiment of the invention.

A still further aspect of the invention relates to an apparatus comprising at least one processor; and at least one memory including a computer program code, wherein the at least one memory and the computer program code are configured to, with the at least one processor, cause the apparatus to configure semi-persistent transmission resources to a user equipment via higher layer signalling, wherein the configuring includes pre-allocating a data transmission resource and assigning a scheduling request resource to the user equipment; and transmit a confirmation message to the user equipment, the confirmation message informing the user equipment that the user equipment is able to start transmitting data on a physical uplink shared channel PUSCH to the apparatus by using the pre-allocated data transmission resource and a pre-configured transmission format, wherein the pre-allocated data transmission resource is linked to the corresponding confirmation message, corresponding confirmation message (303) being linked to the corresponding semi-persistently assigned scheduling request resource.

A still further aspect of the invention relates to a user equipment comprising a communication control circuitry configured to receive, from a network apparatus, a confirmation message, the confirmation message informing the user equipment that the user equipment is able to start transmitting data on a physical uplink shared channel PUSCH to the network apparatus by using a pre-configured transmission format and a pre-allocated data transmission resource configured, in the network apparatus, to the user equipment via higher layer signalling, the configuring including pre-allocating the data transmission resource and assigning a scheduling request resource to the user equipment, wherein the pre-allocated data transmission resource is linked to the corresponding confirmation message, the corresponding confirmation message (303) being linked to a corresponding semi-persistently assigned scheduling request resource.

A still further aspect of the invention relates to a computer program comprising program code means adapted to perform the method steps according to an embodiment of the invention when the program is run on a computer.

A still further aspect of the invention relates to a computer readable storage medium comprising computer readable code for executing a computer process according to an embodiment of the invention.

Although the various aspects, embodiments and features of the invention are recited independently, it should be appreciated that all combinations of the various aspects, embodiments and features of the invention are possible and within the scope of the present invention as claimed.

BRIEF DESCRIPTION OF THE DRAWINGS

In the following the invention will be described in greater detail by means of exemplary embodiments with reference to the attached drawings, in which.

DETAILED DESCRIPTION OF SOME EMBODIMENTS

Figure 1:
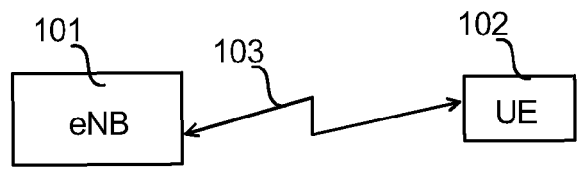
FIG. 1 shows a simplified block diagram illustrating exemplary system architecture.

LTE standardization continues in 3GPP with Release 11. A lot of interest has been around enhancements related to uplink transmission. SI/WI proposals for e.g. enhanced uplink transmission for LTE, machine type communications, and coverage enhancements have been presented and agreed. These involve aspects related to making LTE uplink operation more robust and optimized.

One aspect related to UL operation is the scheduling overhead with small and aperiodic (i.e. non-periodic) data packets. Overhead generally refers to control information which needs to be able to convey payload data, and which includes e.g. resource allocation and MAC signalling. An existing LTE solution to minimize scheduling overhead is based on semi-persistent scheduling (SPS) of the resources, where the data is sent without associated dynamic control signalling (such as PDCCH DL assignments) by using persistently allocated transmission resources. However, SPS is only effective for services having periodic and constant packet sizes (such as VoIP).

An exemplary embodiment discloses providing optimized solutions for efficient UL scheduling to minimize the downlink control signalling overhead for aperiodic and constant size packets. Thus, an exemplary embodiment relates to uplink (UL) operations to avoid scheduling overhead in systems like LTE. There may be a certain relevancy or applicability also for a machine type communication (MTC) environment as an exemplary embodiment addresses frequently transmitted small packets. The relevant components may include eNBs and UEs.

LTE is expected to gradually become a predominant radio access technology for a diverse set of data applications. In addition to data downloading etc. resource-heavy applications, LTE is also expected to be the radio access selected to carry small data packets for various applications more or less frequently. Examples of this kind of traffic may include, for example:

Reporting with smart meters
    warning event reporting: the device reports an event once an abnormal event is detected,
    on-demand response: the device conducts on-demand requests and reports, Smart phones, tablets, laptops, etc.
    TCP ACK/NACK signals: web browsing initiates transmission of TCP ACK/NACKs which, from the LTE layer 1 point of view, may be seen as small data packets,
    some of applications that are typically "on", e.g. email and instant messaging applications, may generate traffic containing a large number of small data packets.

A common nominator for the above applications and use cases is the fact that they consume a large amount of PDCCH resources for scheduling UL data (small data packets→large number of simultaneously scheduled users, but a non-deterministic traffic pattern is not suitable for SPS). Therefore there is a need to optimize the UL scheduling, bearing these scenarios in mind.

The existing LTE solution to avoid scheduling overhead is based on semi-persistent scheduling (SPS) of the resources, where the data is sent without associated dynamic control signalling (such as PDCCH) by using persistently allocated transmission resources. However, SPS is only effective for services having periodic and constant packet sizes (such as VoIP).

Smart phones as well as machine-like terminals including e.g. vending machines, smart meters etc. are envisioned to create a lot of small data packets. However, the data traffic of such terminals is not expected to be periodic unlike in e.g. voice applications, and therefore SPS does not provide a good enough solution for scheduling overhead reductions in such scenarios.

An exemplary embodiment may be seen as an improvement of semi-persistent and periodic scheduling of UE in UL. On other hand, the scheduling solution according to an exemplary embodiment may be seen as an improvement of the semi-persistent scheduling specified by 3GPP (e.g. a possibility to have a joint-coded group grant, a minimum amount of information (1 bit)). In addition to the scheduling approach, an exemplary embodiment enables requesting resources by a scheduling request, and for assigning the resources to UEs.

For the periodicity, it seems that with Release 10 SPS, the periodicity of the SPS allocation is already configured using higher layer signalling, while PUSCH resources and transmission format are scheduled using UL grant. An exemplary embodiment enables introducing following enhancements:

a) PUSCH resources and transmission format are also configured (together with the periodicity) via higher layer (e.g. RRC, RLC, MAC) signalling, b) periodicity is optional, i.e. current scheme may also be used for "one-shot" type of transmissions, wherein b) may be seen as a special case of a) where periodicity is infinite.

On the other hand, in b), where the UE—only when it has the need—may request for pre-configured PUSCH resources. Following from that, eNB may dynamically either confirm the request, or allocate alternative resources (e.g. due to ongoing PUSCH retransmissions on the preconfigured PUSCH resources used temporarily for another UE), or deny the request. This may be implemented with efficient signalling, where, in SPS, with an infinite period, eNB configures resources and UE may transmit once some time in infinity.

A physical layer procedure for aperiodic and constant size packets according to an exemplary embodiment enables providing means to schedule aperiodic UL data with constant size packets without having a need to transmit a dedicated UL resource allocation grant. An exemplary embodiment enables device-initiated data transmission (e.g. warning event report), and may also provide a separate embodiment for node-B triggered reporting from the device (an on-demand response).

Device-initiated Transmission

According to an exemplary embodiment, in the case of device-initiated transmission the procedure between the device (UE) and eNode-B may be illustrated with following steps:

Step 1: eNode-B configures the semi-persistent transmission resources to the device via higher layer signalling. The semi-persistent configuration of transmission resources includes data transmission resources and the scheduling request resource. eNode-B also may configure multiple sets of resources to a single UE.

Step 2: When the device has data in the buffer, it sends scheduling request comprising one or more bits by using a semi-persistently assigned scheduling request resource. By means of the scheduling request, the device may inform the network on the data in the buffer, e.g. on the amount of the data in the buffer (for example, a one-bit scheduling request may be enough to tell to network that there is data in the buffer; more bits may be needed to tell e.g. that how much data there is in the buffer).

Step 3: If eNode-B detects a scheduling request, it transmits a confirmation to the device. The resource for the confirmation is linked to the scheduling request resource.

Step 4: When the device has sent the scheduling request, it is able to start reception (e.g. decoding) on the predetermined confirmation resource after a pre-configured/defined time (e.g. 4 sub-frames).

Step 5: After detecting the confirmation message, the device starts transmitting UL data by using a preconfigured resource and a preconfigured format.

The confirmation information may be transmitted separately for each device, or it may be jointly coded into one or multiple messages.

In the case of joint coding, a form of group grant may be associated to a group of devices having a scheduling request resource at the same time instance. The group grant includes confirmation bits for each device allocated into the same group. Several group grants may exist at the same time instance. The device finds its own group grant and confirmation bit index based on its scheduling request resource index. The content of the group grant may be CRC-protected and/or scrambled by a group-specific identity.

In the case of separate coding, the confirmation resource may utilize resources (one or multiple bits) corresponding to a downlink HARQ feedback channel (PHICH). The device identifies its own PHICH resource index for the conformation message e.g. implicitly based on the scheduling request resource index.

The confirmation information may comprise one or multiple bits. Multiple bits may be used to indicate the device which set of uplink resources the device is supposed to use. This provides further flexibility in resource assignment and helps in mitigating resource allocation collisions and scheduling restrictions among different UEs.

Node-B-triggered Transmission

According to an exemplary embodiment, node-B-triggered transmission may be seen as a separate embodiment. Node-B-triggered transmission may be used e.g. as a continuation of transmission after a first SR-triggered transmission. This is a useful feature when PDCCH forms a bottleneck for UL scheduling, e.g. during heavy DL load.

In node-B-triggered transmission, the procedure is mainly similar to the device-initiated transmission procedure except that UE does not transmit the request (step 2) but eNode-B initiates the transmission.

eNode-B configures the PUSCH resource and reporting mode to a device via higher layer signalling. eNode-B may then send a reporting request containing, e.g. one or more bits to the device, and the device may then transmit the report/data directly without a separate grant signalling from node-B by using a pre-configured resource. The pre-configured resource may be present with a configurable periodicity, in order to allow a form of DRX periods for UE.

The reporting request from eNode-B to the device may be jointly coded for multiple UEs and transmitted in a form of group grant.

Used Transmission Formats

Transmission of a scheduling request may use, not only a PUCCH format 1, but alternatively also a dedicated PRACH resource semi-persistently allocated for device. (As with PUCCH format 1, the dedicated PRACH resource configuration also involves periodicity). To avoid conflicts with normal PRACH operation:

the used preambles may be sequences that are not part of cell-specific preamble set, or the used resources do not overlap with normal PRACH resources either in time (sub-frames) or frequency.

The used cyclic shift separation used in preamble configuration may be considerably smaller than with normal PRACH preambles and dimensioned according to a radio channel delay profile due to a smaller timing uncertainty, resulting in considerably more efficient multiplexing.

DCI format 3, originally used for transmission of power control commands, may be used as a group grant for sending jointly coded confirmation messages or eNB-triggered reporting requests.

Thus, several group grants may exist at the same time instance. With confirmation messages, this may occur, for example, in two cases:

Devices having scheduling request resource at the same time instance may be associated into different groups e.g. based on the allocated scheduling request resource.

The time offset/delay between the scheduling request and the confirmation message may not be fixed to a single value (e.g. 4 ms) but a time window covering multiple sub-frames (e.g. 4-6 ms). This of course may require the use of a larger number of group-specific identities.

As an alternative to joint coding and group grant, transmission of confirmation messages and/or eNB-triggered reporting requests may be carried out by using separate coding and PHICH. A normal PHICH resource, used for HARQ feedback, is implicitly signalled to the terminal via the PUSCH resource, and DM RS allocation fields and eNB are to avoid PHICH resource collisions between terminals by configuration of these fields. Hence, there needs to be considerably more PHICH resources than there are actual HARQ feedback bits. Therefore, the PHICH resources may also be used simultaneously for confirmation messages which have a quite low activity per resource. In the case that the HARQ feedback and the confirmation message to a detected SR have a PHICH resource collision, and the HARQ feedback bit and the confirmation message bit differ (it makes sense to use a positive ACK bit which is more frequent than a negative ACK bit, for a more frequent confirmation message), eNB may solve the collision by sending a normal scheduling grant to the terminal that sent the corresponding SR (and the HARQ feedback on PHICH).

Thus, an exemplary embodiment introduces a control channel overhead mechanism that contains a resource allocation solution that may be used for handling uplink small aperiodic data transmissions of a predefined size (that may be used for the transfer of TCP ACKs/NACKs, machine-to-machine messages, status reports etc.) without the need to send resource allocation grants for each packet. Both device-initiated and network initiated data transmissions are addressed. In device-initiated transmission, these resources may then be used dynamically where UE sends a short request that it wants to use the resources, and eNB confirms this, and then UE may use those resources. In a network-initiated transmission, the procedure is similar except that UE does not transmit the request, but eNB initiates the transmission.

In an exemplary embodiment, UE may access (semi-persistently via higher layer signalling, e.g. RRC, RLC, MAC) pre-configured PUSCH resources with no need for a dedicated UL resource allocation grant—basically only one confirmation message from eNB is needed which may potentially be jointly coded to "cover" scheduling requests from multiple terminals simultaneously by using grouping and joint coding of 1-bit scheduling grants (thus further reducing the control signalling overhead).

In an exemplary embodiment, there is a possibility to schedule semi-persistently and non-periodic data packets in UL on request.

An exemplary embodiment involves a (LTE) specific application of a more generic principle of granting access to a shared resource for a controlled entity by a controlling entity whereby the knowledge about the resource is pre-shared/pre-configured between the controlled entity and the controlling entity.

In an exemplary embodiment, SPS may be configured, and 1-bit messages (to/from the device) may be used to accomplish the scheduling. The 1-bit request and grant messages may be piggy-backed on existing UL/DL physical channels.

An exemplary embodiment comprises introducing a set of shared resources that are potentially available for scheduling, but UE is only allowed to access these following a request/short (1-bit) grant procedure. Potentially, this procedure may happen with shorter delay than regular grants are subject to. Also this may enable joint coded group grant.

An exemplary embodiment provides a possibility to schedule aperiodic UL data with constant-size packets with considerably smaller DL control overhead than existing systems, as no dedicated UL resource allocation grant is needed. The amount of small aperiodic packets may be considerable e.g. due to TCP ACK/NACK signalling.

Further, the first UL allocation after receiving SR tends to be conservative e.g. as the terminal's buffer status is unknown to eNB. Hence the loss from using pre-configured configuration instead of more flexible scheduling grant may be seen to be small.

In a scenario where the PDCCH is a bottleneck, delay of the UL transmission is less important, and other resources like PUSCH, PUCCH etc. need not be handled in an optimized way, an exemplary embodiment provides a means to offload PDCCH by replacing/enhancing the mechanism of giving dedicated UL resource allocations grant (following a request to be scheduled by UE) by a mechanism to give grants to pre-configured resources via a very short confirmation from eNB to UE (either on a channel being different from PDCCH or using an optimized format on PDCCH). Thus, in an exemplary embodiment, UE only does occasional and non-periodic transmissions where the proposed approach may be beneficial, while optimum utilization of other resources like PUSCH is not necessarily required. An exemplary embodiment may provide more scheduling flexibility than the regular SPS and less control overhead than the normal PDCCH way of scheduling uplink data transmissions. An exemplary embodiment provides an optimization for the case where PDCCH capacity for UL grants (i.e. the number of simultaneous UL grants that may be transmitted) is the bottleneck of the system.

Exemplary embodiments of the present invention will now be de-scribed more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, network element, server, corresponding component, and/or to any communication system or any combination of different communication systems that support packet scheduling. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, without restricting the embodiment to such an architecture, however.

With reference to FIG. 1, let us examine an example of a radio system to which embodiments of the invention can be applied. In this example, the radio system is based on LTE network elements. However, the invention described in these examples is not limited to the LTE radio systems but can also be implemented in other radio systems, such as UMTS (universal mobile telecommunications system), GSM, EDGE, WCDMA, bluetooth network, WLAN or other fixed, mobile or wireless network. In an embodiment, the presented solution may be applied between elements belonging to different but compatible systems such as LTE and UMTS.

A general architecture of a communication system is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements, and protocols used in or for fixed or wireless communication are irrelevant to the actual invention. Therefore, they need not be discussed in more detail here.

The exemplary radio system of FIG. 1 comprises a network apparatus 101 of a network operator. The network apparatus 101 may include e.g. a base station (BS, node-B, eNB), access point (AP), radio network controller (RNC), or any other network element or a combination of network elements. In FIG. 1, the radio network node 101 that may also be called a base station (BS) and/or eNB/RNC (enhanced node-B/radio network controller) of the radio system hosts the functions for radio resource management in a public land mobile network. FIG. 1 shows one or more user equipment 102 located in the service area of the radio network node 101. The user equipment refers to a portable computing device, and it may also be referred to as a user terminal. Such computing devices include wireless mobile communication devices operating with or without a subscriber identification module (SIM) in hardware or in software, including, but not limited to, the following types of devices: mobile phone, smart-phone, personal digital assistant (PDA), handset, laptop computer. In the example situation of FIG. 1, the user equipment 102 is capable of connecting to the radio network node 101 via a connection 103.

FIG. 1 only illustrates a simplified example. In practice, the net-work may include more network elements and user terminals. The networks of two or more operators may overlap, the sizes and form of the cells may vary from what is depicted in FIG. 1, etc. The communication system may also be able to communicate with other networks, such as a public switched telephone network. The embodiments are not, however, restricted to the network given above as an example, but a person skilled in the art may apply the solution to other communication networks provided with the necessary properties. For example, the connections between different network elements may be realized with internet protocol (IP) connections.

Figure 2:
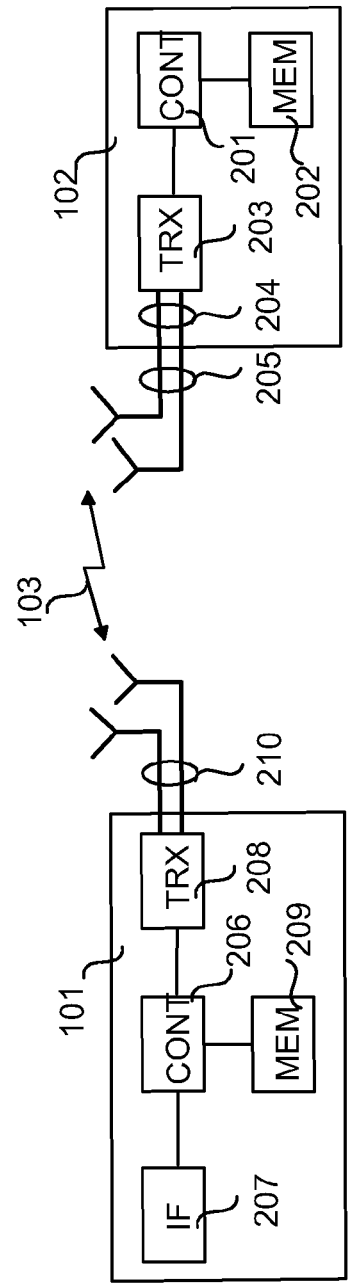
FIG. 2 shows a simplified block diagram illustrating exemplary apparatuses.

FIG. 2 illustrates examples of apparatuses according to embodiments of the invention. FIG. 2 shows a user equipment 102 located in the area of the radio network node 101. The user equipment is configured to be in connection with the radio network node 101. The user equipment or UE 102 comprises a controller 201 operationally connected to a memory 202 and a transceiver 203. The controller 501 controls the operation of the user equipment 102. The memory 202 is configured to store software and data. The transceiver 203 is configured to set up and maintain a wireless connection to the radio network node 101. The transceiver is operationally connected to a set of antenna ports 204 connected to an antenna arrangement 205. The antenna arrangement 205 may comprise a set of antennas. The number of antennas may be one to four, for example. The number of antennas is not limited to any particular number. The user equipment 102 may also comprise various other components, such as a user interface, camera, and media player. They are not displayed in the figure due to simplicity. The radio network node 101 comprises a controller 206 operationally connected to an interface 207, a transceiver 208, and a memory 209. The controller 206 controls the operation of the radio network node 101. The transceiver 208 is configured to set up and maintain a wireless connection to the user equipment 102 within the service area of the radio network node 101. The memory 209 is configured to store software and data. The transceiver 208 is operationally connected to an antenna arrangement 210. The antenna arrangement 210 may comprise a set of antennas. The number of antennas may be two to four, for example. The number of antennas is not limited to any particular number. The radio network node may be operationally connected (directly or indirectly) to another network element of the communication system (not shown in FIG. 2), such as an MSC server (MSS), a mobile switching centre (MSC), a common radio resource management (CRRM) node, a gateway GPRS support node, an operations, administrations and maintenance (OAM) node, a home location register (HLR), a visitor location register (VLR), a serving GPRS support node, MME (mobility management entity), a base station controller (BSC), a gateway, and/or a server, for example. The embodiments are not, however, restricted to the network given above as an example, but a person skilled in the art may apply the solution to other communication networks provided with the necessary properties. For example, the connections between different network elements may be realized with internet protocol (IP) connections.

The memory may include volatile and/or non-volatile memory and typically stores content, data, or the like. For example, the memory may store computer program code such as software applications (for example for the detector unit and/or for the adjuster unit) or operating systems, information, data, content, or the like for the processor to perform steps associated with operation of the apparatus in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firm-ware or software, implementation can be through modules (e.g. procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

User equipment may refer to any user communication device. A term "user equipment" as used herein may refer to any device having a communication capability, such as a wireless mobile terminal, a PDA, tablet, a smart phone, a personal computer (PC), a laptop computer, a desktop computer, etc. For example, the wireless communication terminal may be an UMTS or GSM/EDGE smart mobile terminal having wireless modem. Thus, the application capabilities of the device according to various embodiments of the invention may include native applications available in the terminal, or subsequently installed applications by the user or operator or other entity. The eNB/RNC node may be implemented in any network element, such as a server.

FIG. 2 is a block diagram of an apparatus according to an embodiment of the invention. Although the apparatus has been depicted as one entity, different modules and memory may be implemented in one or more physical or logical entities.

The functionality of the network apparatus 101 is described in more detail below with FIGS. 3 and 4. It should be appreciated that the apparatus 101 may comprise other units used in or for distributed computing and/or data federation. However, they are irrelevant to the actual invention and, therefore, they need not to be discussed in more detail here.

The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting in-formation to the network, connectable to the network wirelessly or via a fixed connection. Examples of the user terminal include a personal computer, a game console, a laptop (a notebook), a personal digital assistant, a mobile station (mobile phone), and a line telephone.

The apparatus 101, 102 may generally include a processor, controller, control unit or the like connected to a memory and to various interfaces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firm-ware or software, implementation may be through modules (e.g. procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it may be communicatively coupled to the processor/computer via various means as is known in the art.

Figure 3:
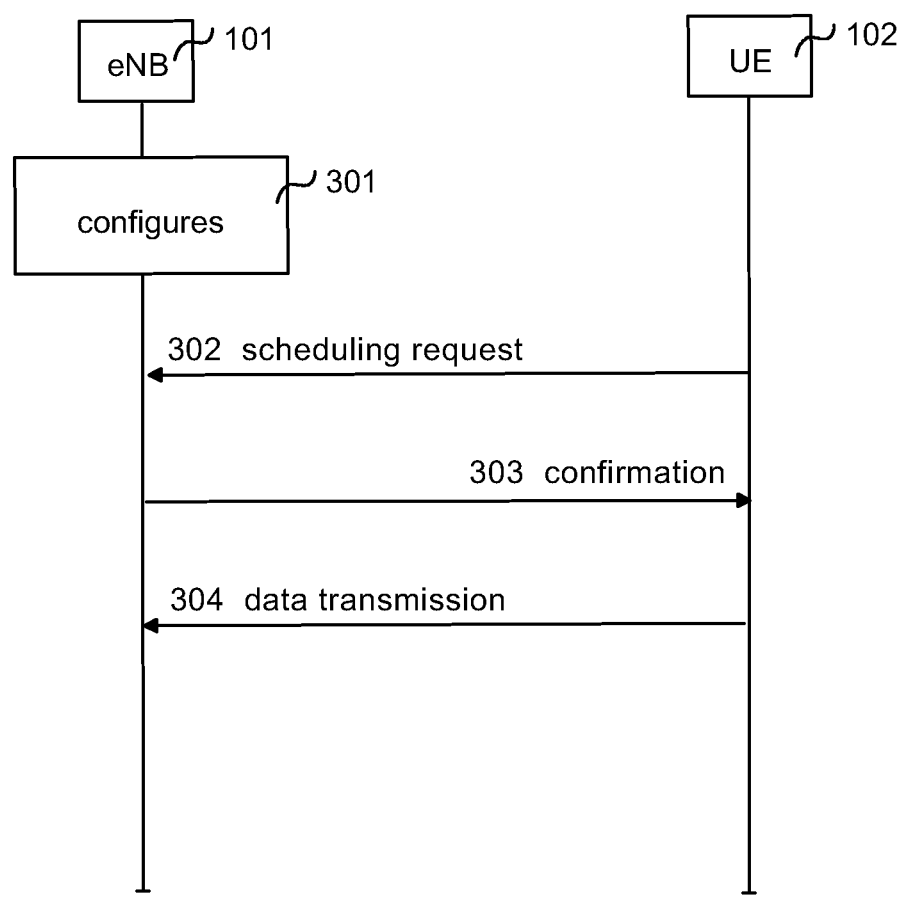
FIG. 3 shows a messaging diagram illustrating signalling according to an exemplary embodiment.

The signalling chart of FIG. 3 illustrates the required signalling. In the example of FIG. 3, a network apparatus 101 which may comprise e.g. a network element (network node) eNB/RNC, configures 301 semi-persistent transmission resources to a user equipment 102 via higher layer signalling. This semi-persistent pre-configuration of transmission resources includes pre-allocating data transmission resources and assigning a scheduling request resource to the user equipment 102. At this stage, eNB/RNC may send (not shown in FIG. 3) to UE an indication on the assignment of the scheduling request resource, as a part of the RRC configuration The network apparatus 101 may configure 301 multiple sets of resources to a single UE. The network apparatus 101 may configure the resources e.g. in response to the user equipment registering to the network/to the cell in question (e.g. in response to signalling succeeding a RACH procedure). When the user equipment 102 has data in a buffer, it is configured to send a one-bit (or multiple-bit) scheduling request 302 to eNB/RNC 101, by using a semi-persistently assigned scheduling request resource. In response to the apparatus 101 detecting the receipt of the scheduling request 302, the apparatus 101 is configured to transmit a confirmation message 303 to the user equipment 102. The data transmission resource related to the confirmation 303 is linked to the corresponding scheduling request 302 resource. When the user equipment 102 has sent the scheduling request 302, it is able to start reception (e.g. decoding) on the predetermined confirmation resource after a pre-configured/defined time (e.g. 4 sub-frames). After detecting the confirmation message 303, the user equipment 102 is able to start transmitting UL data (i.e. PUSCH data) 304 to eNB 101 by using the (in item 301) preconfigured data transmission resource.

In an exemplary embodiment, the transmission of the request 302 is optional, i.e. UE does not transmit the request 302 but eNode-B initiates the transmission procedure.

Figure 4:
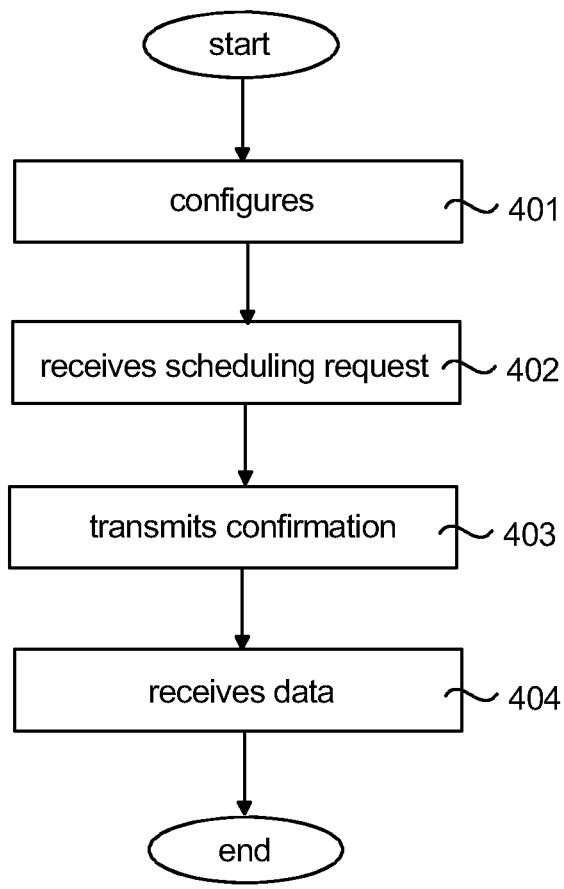
FIG. 4 shows a schematic diagram of a flow chart according to an exemplary embodiment.

FIG. 4 is a flow chart illustrating an exemplary embodiment. The apparatus 101, which may comprise e.g. a network element (network node, e.g. an enhanced node-B/radio network controller), configures, in item 401, semi-persistent transmission resources to a user equipment 102 via higher layer signalling. This semi-persistent pre-configuration of transmission resources includes pre-allocating data transmission resources and assigning a scheduling request resource to the user equipment 102. At this stage, eNB/RNC may send (not shown in FIG. 4) to UE an indication on the assignment of the scheduling request resource, as a part of the RRC configuration. The network apparatus 101 may configure 401 multiple sets of resources to a single UE. When the user equipment 102 has data in a buffer, it may send a one-bit (or multiple-bit) scheduling request by using a semi-persistently assigned scheduling request resource, wherein when the apparatus 101 detects, in item 402, the receipt of the scheduling request, the apparatus 101 is configured to transmit, in item 403, a confirmation message to the user equipment 102. The data transmission resource related to the confirmation is linked to the corresponding scheduling request resource. When the user equipment 102 has sent the scheduling request, it is able to start reception (e.g. decoding) on the predetermined confirmation resource after a pre-configured/defined time (e.g. 4 sub-frames). After detecting the confirmation message, the user equipment 102 is able to start transmitting UL data (i.e. PUSCH data) to eNB 101 by using the (in item 401) preconfigured data transmission resource, wherein the network apparatus 101 receives, in item 404, PUSCH data transmission from the user equipment 102.

In an exemplary embodiment, the reception of the scheduling request in step 402 is optional, i.e. UE does not transmit the scheduling request but eNode-B initiates the transmission procedure.

Figure 5:
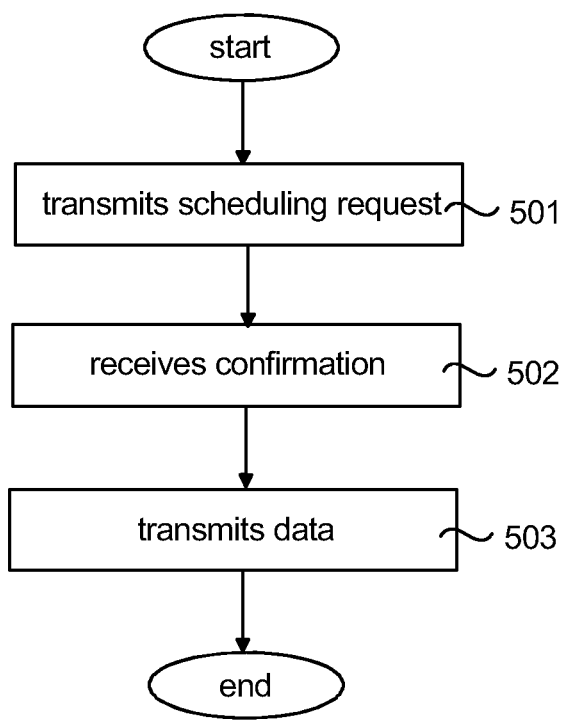
FIG. 5 shows a schematic diagram of a flow chart according to an exemplary embodiment.

FIG. 5 is a flow chart illustrating an exemplary embodiment. The apparatus 102, which may comprise e.g. a user terminal (user equipment UE), is configured to, when the user equipment 102 has uplink data in a buffer, send, in item 401, a one-bit (or multiple-bit) scheduling request to eNB/RNC 101, by using a semi-persistently assigned scheduling request resource. The apparatus 101 transmits a confirmation message to the user equipment 102 such that the data transmission resource related to the confirmation (and configured by eNB to UE) is linked to the corresponding scheduling request resource. When the user equipment 102 has sent, in item 501, the scheduling request, it is able to start reception (e.g. decoding) on the predetermined confirmation resource after a pre-configured/defined time (e.g. 4 sub-frames). After detecting, in item 502, the receipt of the confirmation message, the user equipment 102 is able to start, in item 503, transmitting UL data (i.e. PUSCH data) to eNB 101 by using the preconfigured data transmission resource.

In an exemplary embodiment, the transmission of the scheduling request in item 501 is optional, i.e. UE does not transmit the request 302 but eNode-B initiates the transmission procedure.

Thus, according to an exemplary embodiment, there is provided a method for scheduling packet data in a communications system, the method comprising configuring, in a network apparatus, semi-persistent transmission resources to a user equipment via higher layer signalling, wherein the configuring includes pre-allocating a data transmission resource and assigning a scheduling request resource to the user equipment; and transmitting, from the network apparatus a confirmation message to the user equipment, the confirmation message informing the user equipment that the user equipment is able to start transmitting data on a physical uplink shared channel PUSCH to the network apparatus by using the pre-allocated data transmission resource and a pre-configured transmission format, wherein the pre-allocated data transmission resource is linked to the corresponding confirmation message, the corresponding confirmation message being linked to the corresponding semi-persistently assigned scheduling request resource.

According to another exemplary embodiment, the confirmation message is transmitted from the network apparatus to the user equipment, in response to receiving, in the network apparatus, a scheduling request message from the user equipment, the scheduling request message being transmitted by using the semi-persistently assigned scheduling request resource when the user equipment has data in a buffer.

According to yet another exemplary embodiment, there is provided a method for allowing the user equipment to start reception on a predetermined confirmation resource after a predefined time after sending the scheduling request message.

According to yet another exemplary embodiment, the scheduling request message comprises a one-bit or multiple-bit scheduling request.

According to yet another exemplary embodiment, there is provided a method for transmitting of the scheduling request message by using a PUCCH format 1; and/or by using a dedicated PRACH resource semi-persistently allocated for the user equipment, wherein preambles used are sequences that are not part of a cell-specific preamble set, wherein the assigned scheduling request resource does not overlap with regular PRACH resources in time nor frequency.

According to yet another exemplary embodiment, there is provided a method for scheduling aperiodic uplink data with constant size packets without having a need to transmit a dedicated uplink resource allocation grant message.

According to yet another exemplary embodiment, there is provided a method for scheduling aperiodic uplink data such that downlink control signalling overhead for aperiodic and constant size packets is minimized.

According to yet another exemplary embodiment, there is provided a method for configuring multiple sets of resources to a single user equipment, wherein the resource to be used is indicated in the confirmation message.

According to yet another exemplary embodiment, the configuring of the resources is carried out in response to the user equipment registering to a network.

According to yet another exemplary embodiment, there is provided a method for using DCI format 3 as a group grant for sending jointly coded confirmation messages and/or eNB-triggered reporting requests.

According to yet another exemplary embodiment, there is provided a method for transmission of the confirmation message and/or eNB-triggered reporting request by using PHICH, wherein a normal PHICH resource, used for HARQ feedback, is configured to the user equipment as a confirmation message resource.

According to yet another exemplary embodiment, there is provided an apparatus comprising a communication control circuitry configured to configure semi-persistent transmission resources to a user equipment via higher layer signalling, wherein the configuring includes pre-allocating a data transmission resource and assigning a scheduling request resource to the user equipment; and transmit a confirmation message to the user equipment, the confirmation message informing the user equipment that the user equipment is able to start transmitting data on a physical uplink shared channel PUSCH to the apparatus by using the pre-allocated data transmission resource and a pre-configured transmission format, wherein the pre-allocated data transmission resource is linked to the corresponding confirmation message, the corresponding confirmation message being linked to the corresponding semi-persistently assigned scheduling request resource.

According to yet another exemplary embodiment, the communication control circuitry is further configured to transmit the confirmation message to the user equipment, in response to receiving a scheduling request message from the user equipment, the scheduling request message being transmitted by using the semi-persistently assigned scheduling request resource when the user equipment has data in a buffer.

According to yet another exemplary embodiment, the communication control circuitry is further configured to allow the user equipment to start reception on a predetermined confirmation resource after a pre-defined time after sending the scheduling request message.

According to yet another exemplary embodiment, the scheduling request message comprises a one-bit or multiple-bit scheduling request.

According to yet another exemplary embodiment, the communication control circuitry is further configured to receive the scheduling request message transmitted from the user equipment by using a PUCCH format 1; and/or by using a dedicated PRACH resource semi-persistently allocated for the user equipment, wherein preambles used are sequences that are not part of a cell-specific preamble set, wherein the assigned scheduling request resource does not overlap with regular PRACH resources in time nor frequency.

According to yet another exemplary embodiment, the communication control circuitry is further configured to schedule aperiodic uplink data with constant size packets without having a need to transmit a dedicated uplink resource allocation grant message.

According to yet another exemplary embodiment, the communication control circuitry is further configured to schedule aperiodic uplink data such that downlink control signalling overhead for aperiodic and constant size packets is minimized.

According to yet another exemplary embodiment, the communication control circuitry is further configured to configure multiple sets of resources to a single user equipment; and indicate in the confirmation message the resource to be used.

According to yet another exemplary embodiment, the communication control circuitry is further configured to carry out the configuring of the resources in response to the user equipment registering to a network.

According to yet another exemplary embodiment, the communication control circuitry is further configured to use DCI format 3 as a group grant for sending jointly coded confirmation messages and/or eNB-triggered reporting requests.

According to yet another exemplary embodiment, the communication control circuitry is further configured to transmit the confirmation message and/or eNB-triggered reporting request by using PHICH, wherein a normal PHICH resource, used for HARQ feedback, is configured to the user equipment as a confirmation message resource.

According to yet another exemplary embodiment, there is provided an apparatus comprising means for carrying out the method.

According to yet another exemplary embodiment, there is provided an apparatus comprising at least one processor; and at least one memory including a computer program code, wherein the at least one memory and the computer program code are configured to, with the at least one processor, cause the apparatus to configure semi-persistent transmission resources to a user equipment via higher layer signalling, wherein the configuring includes pre-allocating a data transmission resource and assigning a scheduling request resource to the user equipment; and transmit a confirmation message to the user equipment, the confirmation message informing the user equipment that the user equipment is able to start transmitting data on a physical uplink shared channel PUSCH to the apparatus by using the pre-allocated data transmission resource and a pre-configured transmission format, wherein the pre-allocated data transmission resource is linked to the corresponding confirmation message, the corresponding confirmation message being linked to the corresponding semi-persistently assigned scheduling request resource.

According to yet another exemplary embodiment, there is provided a user equipment comprising a communication control circuitry configured to receive, from a network apparatus, a confirmation message, the confirmation message informing the user equipment that the user equipment is able to start transmitting data on a physical uplink shared channel PUSCH to the network apparatus by using a pre-configured transmission format and a pre-allocated data transmission resource configured, in the network apparatus, to the user equipment via higher layer signalling, the configuring including pre-allocating the data transmission resource and assigning a scheduling request resource to the user equipment, wherein the pre-allocated data transmission resource is linked to the corresponding confirmation message, the corresponding confirmation message being linked to a corresponding semi-persistently assigned scheduling request resource.

According to yet another exemplary embodiment, there is provided a communication control circuitry configured to transmit, to the network apparatus, a scheduling request message, the scheduling request message being transmitted by using the semi-persistently assigned scheduling request resource when the user equipment has data in a buffer.

According to yet another exemplary embodiment, there is provided a computer program comprising program code means adapted to perform any one of the method steps when the program is run on a computer.

According to yet another exemplary embodiment, there is provided a computer readable storage medium comprising computer readable code for executing a computer process according to the method steps.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

3GPP 3rd generation partnership project
ACK (positive) acknowledgement
CRC cyclic redundancy check
DCI downlink control information
DL downlink
eNB enhanced node-B
HARQ hybrid automatic repeat request
LTE long term evolution
NACK negative acknowledgement
PDCCH physical downlink control channel
PDSCH physical downlink shared channel
PHICH physical HARQ indicator channel
PUCCH physical uplink control channel
PUSCH physical uplink shared channel
SI study item
SPS semi-persistent scheduling
SR scheduling request
TCP transmission control protocol
UE user equipment
UL uplink
VoIP voice over internet protocol
WI work item
RRC radio resource control
RLC radio link control
MAC media access control
STM-n synchronous transfer mode-n
SID system identity
RACH random access channel

The invention claimed is:

1. A method for scheduling packet data in a communications system, the method comprising:
configuring, in a network apparatus, semi-persistent transmission resources to a user equipment via higher layer signalling, wherein the configuring includes pre-allocating a data transmission resource and assigning a scheduling request resource to the user equipment; and
transmitting, from the network apparatus a confirmation message to the user equipment, the confirmation message informing the user equipment that the user equipment is able to start transmitting data on a physical uplink shared channel (PUSCH) to the network apparatus by using the pre-allocated data transmission resource and a pre-configured transmission format, wherein the pre-allocated data transmission resource is linked to the corresponding confirmation message, the corresponding confirmation message being linked to the corresponding semi-persistently assigned scheduling request resource.

2. The method according to claim 1, wherein the confirmation message is transmitted from the network apparatus to the user equipment, in response to receiving, in the network apparatus, a scheduling request message from the user equipment, the scheduling request message being transmitted by using the semi-persistently assigned scheduling request resource when the user equipment has data in a buffer.

3. The method according to claim 2, characterized by allowing the user equipment to start reception on a predetermined confirmation resource after a pre-defined time after sending the scheduling request message.

4. The method as claimed in claim 2, characterized by comprising communicating of the scheduling request message by:
   using a physical uplink control channel (PUCCH) format 1; and/or
   using a dedicated physical random access channel (PRACH) resource semi-persistently allocated for the user equipment, wherein preambles used are sequences that are not part of a cell-specific preamble set, wherein the assigned scheduling request resource does not overlap with regular PRACH resources in time or frequency.

5. The method as claimed in claim 1, characterized by comprising scheduling aperiodic uplink data with constant size packets without having a need to transmit a dedicated uplink resource allocation grant message.

6. The method as claimed in claim 1, characterized by comprising using downlink control information (DCI) format 3 as a group grant for sending jointly coded confirmation messages and/or eNB-triggered reporting requests.

7. The method as claimed in claim 1, characterized by comprising transmission of the confirmation message and/or eNB-triggered reporting request by using physical HARQ indicator channel (PHICH), wherein a normal PHICH resource, used for hybrid automatic repeat request (HARQ) feedback, is configured to the user equipment as a confirmation message resource.

8. An apparatus comprising means for carrying out the method according to claim 1.

9. A computer program product comprising a non-transitory computer-readable storage medium bearing computer program code embodied therein for use with a computer, the computer program code comprising code for performing the method according to claim 1.

10. A non-transitory computer readable storage medium comprising computer readable code for executing a computer process according to claim 1.

11. An apparatus comprising a communication control circuitry configured to:
   configure semi-persistent transmission resources to a user equipment via higher layer signalling, wherein the configuring includes pre-allocating a data transmission resource and assigning a scheduling request resource to the user equipment; and
   transmit a confirmation message to the user equipment, the confirmation message informing the user equipment that the user equipment is able to start transmitting data on a physical uplink shared channel (PUSCH) to the apparatus by using the pre-allocated data transmission resource and a pre-configured transmission format, wherein the pre-allocated data transmission resource is linked to the corresponding confirmation message, the corresponding confirmation message being linked to the corresponding semi-persistently assigned scheduling request resource.

12. The apparatus according to claim 11, characterized in that the communication control circuitry is further configured to transmit the confirmation message to the user equipment, in response to receiving a scheduling request message from the user equipment, the scheduling request message being transmitted by using the semi-persistently assigned scheduling request resource when the user equipment has data in a buffer.

13. The apparatus according to claim 12, characterized in that the communication control circuitry is further configured to allow the user equipment to start reception on a predetermined confirmation resource after a pre-defined time after sending the scheduling request message.

14. The apparatus as claimed in claim 12, characterized in that the communication control circuitry is further configured to receive the scheduling request message transmitted from the user equipment by
   using a physical uplink control channel (PUCCH) format 1; and/or
   using a dedicated physical random access channel (PRACH) resource semi-persistently allocated for the user equipment, wherein preambles used are sequences that are not part of a cell-specific preamble set, wherein the assigned scheduling request resource does not overlap with regular PRACH resources in time nor frequency.

15. The apparatus as claimed in claim 11, characterized in that the communication control circuitry is further configured to schedule aperiodic uplink data with constant size packets without having a need to transmit a dedicated uplink resource allocation grant message.

16. The apparatus as claimed in claim 11, characterized in that the communication control circuitry is further configured to use downlink control information (DCI) format 3 as a group grant for sending jointly coded confirmation messages and/or eNB-triggered reporting requests.

17. The apparatus as claimed in claim 11, characterized in that the communication control circuitry is further configured to transmit the confirmation message and/or eNB-triggered reporting request by using physical HARQ indicator channel (PHICH), wherein a normal PHICH resource, used for hybrid automatic repeat request (HARQ) feedback, is configured to the user equipment as a confirmation message resource.

18. An apparatus comprising:
   at least one processor; and
   at least one memory including a computer program code, wherein the at least one memory and the computer program code are configured, with the at least one processor, to cause the apparatus to:
   configure semi-persistent transmission resources to a user equipment via higher layer signalling, wherein the configuring includes pre-allocating a data transmission resource and assigning a scheduling request resource to the user equipment; and
   transmit a confirmation message to the user equipment, the confirmation message informing the user equipment that the user equipment is able to start transmitting data on a physical uplink shared channel (PUSCH) to the apparatus by using the pre-allocated data transmission resource and a pre-configured transmission format, wherein the pre-allocated data transmission resource is linked to the corresponding confirmation message, the corresponding confirmation message being linked to the corresponding semi-persistently assigned scheduling request resource.

19. A user equipment comprising a communication control circuitry configured to:
   receive, from a network apparatus, a confirmation message, the confirmation message informing the user equipment that the user equipment is able to start transmitting data on a physical uplink shared channel (PUSCH) to the network apparatus by using a pre-configured transmission format and a pre-allocated data transmission resource configured, in the network apparatus, to the user equipment via higher layer signalling, the configuring including pre-allocating the data transmission resource and assigning a scheduling request resource to the user equipment, wherein the pre-allocated data transmission resource is linked to the corresponding confirmation message, the corresponding confirmation message being linked to a corresponding semi-persistently assigned scheduling request resource.

20. The user equipment according to claim 19, characterized by comprising a communication control circuitry configured to transmit, to the network apparatus, a scheduling request message, the scheduling request message being transmitted by using the semi-persistently assigned scheduling request resource when the user equipment has data in a buffer.

* * * * *